US008261151B2

(12) United States Patent
Niu et al.

(10) Patent No.: US 8,261,151 B2
(45) Date of Patent: Sep. 4, 2012

(54) DYNAMIC INTERFERENCE AVOIDANCE WITH ASYNCHRONOUS HARQ

(75) Inventors: Huaning Niu, Milpitas, CA (US); Hujun Yin, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 928 days.

(21) Appl. No.: 12/317,112

(22) Filed: Dec. 19, 2008

(65) Prior Publication Data

US 2010/0162069 A1   Jun. 24, 2010

Related U.S. Application Data

(60) Provisional application No. 61/134,188, filed on Jul. 7, 2008.

(51) Int. Cl.
- G08C 25/02 (2006.01)
- H04L 1/18 (2006.01)
- H04L 1/14 (2006.01)

(52) U.S. Cl. ........................ 714/750; 714/748
(58) Field of Classification Search .................. 714/750, 714/748

See application file for complete search history.

(56) References Cited

U.S. PATENT DOCUMENTS

| 5,606,729 | A  | * | 2/1997  | D'Amico et al. | 455/67.11 |
| 5,613,218 | A  | * | 3/1997  | Li et al.      | 455/71    |
| 6,131,015 | A  | * | 10/2000 | Hill et al.    | 455/69    |
| 6,219,559 | B1 | * | 4/2001  | Hill et al.    | 455/522   |
| 6,680,950 | B1 | * | 1/2004  | Nagata et al.  | 370/461   |
| 6,904,283 | B2 | * | 6/2005  | Li et al.      | 455/450   |
| 7,818,647 | B2 | * | 10/2010 | Lohr et al.    | 714/750   |
| 7,869,417 | B2 | * | 1/2011  | Damnjanovic et al. | 370/347 |
| 8,090,323 | B2 | * | 1/2012  | Craig et al.   | 455/67.13 |
| 2007/0060167 | A1 | * | 3/2007  | Damnjanovic et al. | 455/450 |
| 2007/0183451 | A1 | * | 8/2007  | Lohr et al.    | 370/473   |
| 2007/0238480 | A1 | * | 10/2007 | Lin et al.     | 455/522   |

OTHER PUBLICATIONS

Yin, Hujun et al., "Hybrid ARQ in 802.16",Dated Jan. 1, 2005, 12 Pages.
Chang et al., "HARQ Operations on RS_UL_DCH," IEEE 802.16 Broadband Wirelss Access Working Group, IEEE C802.16j-07/522r8, IEEE P802.16j/D1: IEEE 802.16j working group letter ballot #28, Nov. 15, 2007, pp. 1-9.

* cited by examiner

*Primary Examiner* — Joseph D Torres
(74) *Attorney, Agent, or Firm* — Schwabe, Williamson & Wyatt, P.C.

(57) ABSTRACT

In a wireless communications network, a wireless device may examine the received signal to determine the strength of the received signal, and also determine the level of interference and noise. If a retransmission is needed due to a message being incorrectly received, these factors may then be processed to estimate whether the probable cause of poor reception is interference from a neighboring network. If such interference is the likely cause, the retransmission may be changed to a different time and/or to different frequencies in a subsequent frame, so that the interference from the neighboring network is less likely to reoccur.

7 Claims, 7 Drawing Sheets

DYNAMIC INTERFERENCE AVOIDANCE WITH ASYNCHRONOUS HARQ

CROSS REFERENCE TO RELATED APPLICATIONS

This application is related to the provisional application titled "Techniques and Improvements for Broadband Wireless Networks", Ser. No. 61/134,188, filed Jul. 7, 2008, and claims priority to that filing date for all applicable subject matter. This application is also related, due to some common subject matter, to U.S. patent application Ser. No. 12/347,862, filed on Dec. 31, 2008, and titled "Interference Avoidance with Synchronous HARQ and Persistent Scheduling".

BACKGROUND

In wireless communication networks, various techniques may be used to overcome the errors that result when the received signal is too weak or distorted to be accurately decoded. One such technique is to use modifiable forms of Hybrid Automatic Repeat Request (HARQ), in which a transmission that was not accurately received is retransmitted at a time that is explicitly scheduled by the network controller (asynchronous HARQ) and/or is retransmitted using a different modulation/coding scheme (adaptive HARQ). Often, the errors in the transmission, and the resultant need for retransmission, are caused by interference from another device in an adjacent network that transmitted at the same time as the transmitter in the current network. With the networks interfering with each other in this manner, one or both of the networks may need to schedule retransmissions. However, many networks use a similar algorithm to schedule their retransmissions, so that the retransmissions may be scheduled at the same time, and therefore interfere with each other again. Conventional network operations do not have a way to detect this repetitive-interference situation, and therefore have no reliable means to overcome it.

BRIEF DESCRIPTION OF THE DRAWINGS

Some embodiments of the invention may be understood by referring to the following description and accompanying drawings that are used to illustrate embodiments of the invention. In the drawings.

DETAILED DESCRIPTION

Figure 1A:
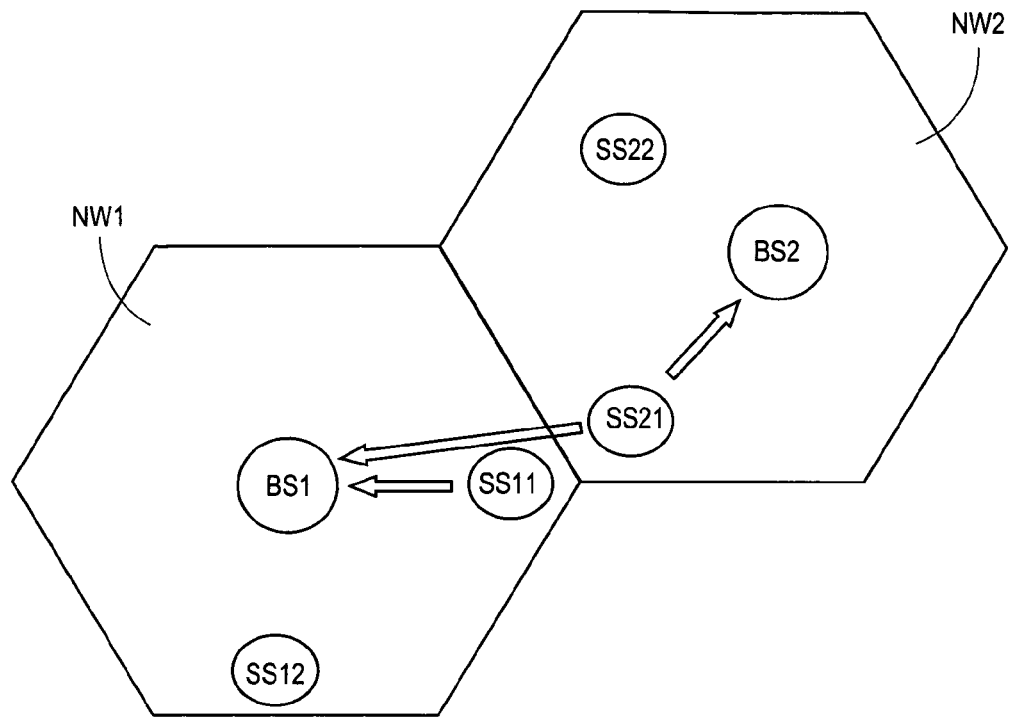
FIGS. 1A, 1B, 2A, and 2B show adjacent wireless communications networks with interference situations that are detected and corrected, according to an embodiment of the invention.
Figure 1B:
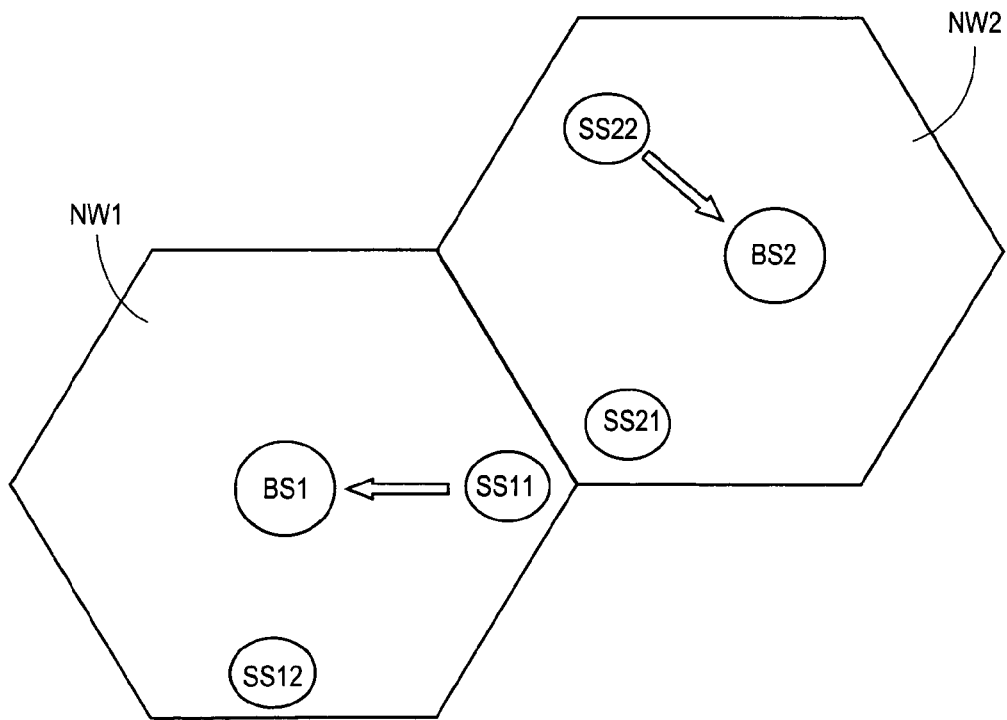

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not be in direct physical or electrical contact.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Various embodiments of the invention may be implemented in one or any combination of hardware, firmware, and software. The invention may also be implemented as instructions contained in or on a computer-readable medium, which may be read and executed by one or more processors to enable performance of the operations described herein. A computer-readable medium may include any mechanism for storing, transmitting, and/or receiving information in a form readable by one or more computers. For example, a computer-readable medium may include a tangible storage medium, such as but not limited to read only memory (ROM); random access memory (RAM); magnetic disk storage media; optical storage media; a flash memory device, etc. A computer-readable medium may also include a propagated signal which has been modulated to encode the instructions, such as but not limited to electromagnetic, optical, or acoustical carrier wave signals.

The term "wireless" and its derivatives may be used to describe circuits, devices, systems, methods, techniques, communications channels, etc., that communicate data by using modulated electromagnetic radiation through a non-solid medium. The term does not imply that the associated devices do not contain any wires, although in some embodiments they might not. The term "base station" is used herein to describe a wireless network controller. The term "subscriber station" is used herein to describe a wireless device whose communications are largely scheduled by the base station. Other terms may be used to describe any of these devices, such as but not limited to access point (AP) for a base station, mobile station (MS) or STA for a subscriber station, etc. The terms used in this document are intended to encompass all such alternative labels for these functional devices.

In a wireless communications network, a wireless device may examine its received signal to determine the strength of the received signal, and the level of interference plus noise contained in the signal. These factors may then be used to determine whether the cause of poor reception was probably interference from another network device in a neighboring network. If such interference was the likely cause, a retransmission may be changed to a different time and/or to different frequencies in a subsequent frame, so that the interference from the neighboring network is less likely to reoccur. The time and frequencies used in a retransmission are collectively referred to here as "time/frequency resources".

FIGS. 1A, 1B, 2A, and 2B show adjacent wireless communications networks with interference situations that are detected and corrected, according to an embodiment of the invention. These figures show two networks, with base station BS1 controlling communications with subscriber stations SS11 and SS12 in network NW1, and base station BS2 controlling communications with subscriber stations SS21 and SS22 in network NW2. The coverage area of each network is shown as hexagonal, with the base station at the center, although in actual operation the network coverage area and placement of the base station may not be so symmetrical or well-defined. The term 'base station' (BS), as used in this document, is intended to include wireless network controllers identified with any other label, such as but not limited to access point (AP), piconet controller (PNC), network controller, etc. The term 'subscriber station' (SS), as used in this document, is intended to include wireless network non-controllers identified with any other label, such as but not limited to mobile station (MS), STA, etc.

In general, the devices in one network are not supposed to communicate with the devices in the other network, although it is possible that transmissions in one network may be picked up by devices in the other network if the networks are close enough together. As an example, it is possible that from time to time, a transmission from SS11 to BS1 will occur at approximately the same time as a transmission from SS21 to BS2. Since SS's typically use omnidirectional transmission, BS1 may pick up the transmissions from both SS11 and SS21 (illustrated in FIG. 1A), with SS21 thereby causing interference at BS1. Similarly, BS2 may pick up the transmission from SS11 at the same time it receives the transmission from SS21 (not illustrated, for the sake of simplicity in the drawing), with SS11 thereby causing interference at BS2. When BS1 does not receive a correct transmission from SS11, and BS2 does not receive a correct transmission from SS21, base stations BS1 and BS2 may each reschedule their associated SS to retransmit the data. If each base station has no knowledge of why it did not receive the intended transmission correctly, both may schedule a retransmission of the missed message during the same part of another frame as the original transmission, resulting in another interference situation. Note: the term 'schedule a retransmission', as used herein, includes selecting a time for the retransmission. In some embodiments, it may also include selecting one or more frequencies for the retransmission, if such frequency selection is permissible in the network.

If base station BS1 applies the rules described later in this document, it may schedule the retransmission from SS11 to BS1 for a different part of the applicable frame, to hopefully eliminate the interference caused by SS11 and SS21 transmitting at the same time. For example, the retransmission from SS11 to BS1 may take place when SS22 is transmitting to BS2 (illustrated in FIG. 1B). Assuming SS22 is too far from BS1 to cause interference, then this retransmission should be successfully received.

Figure 2A:
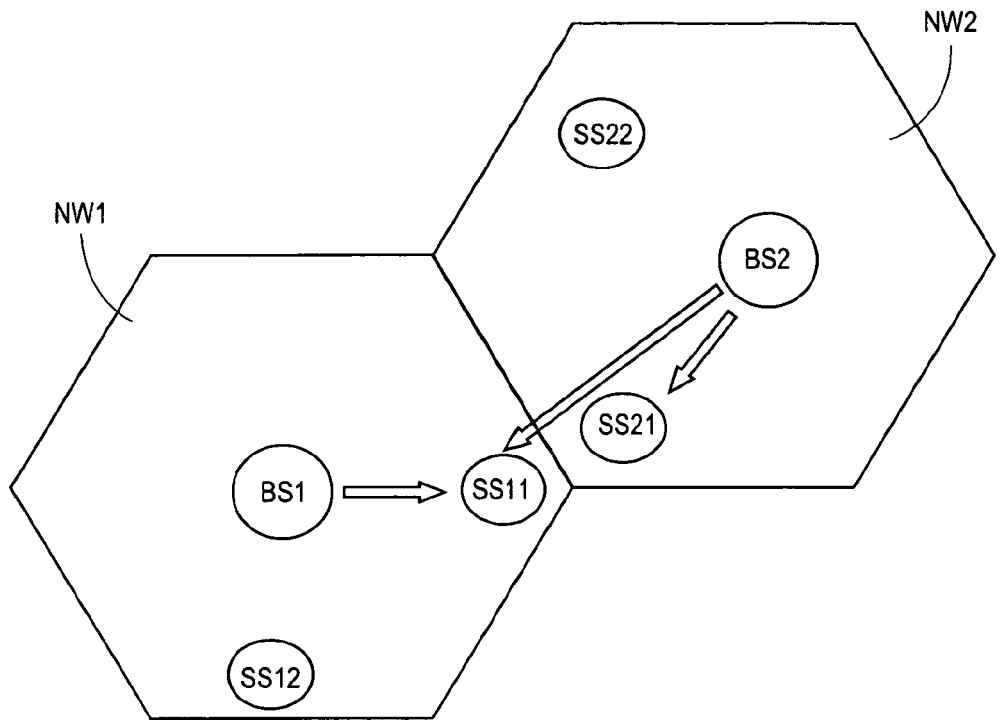
Figure 2B:
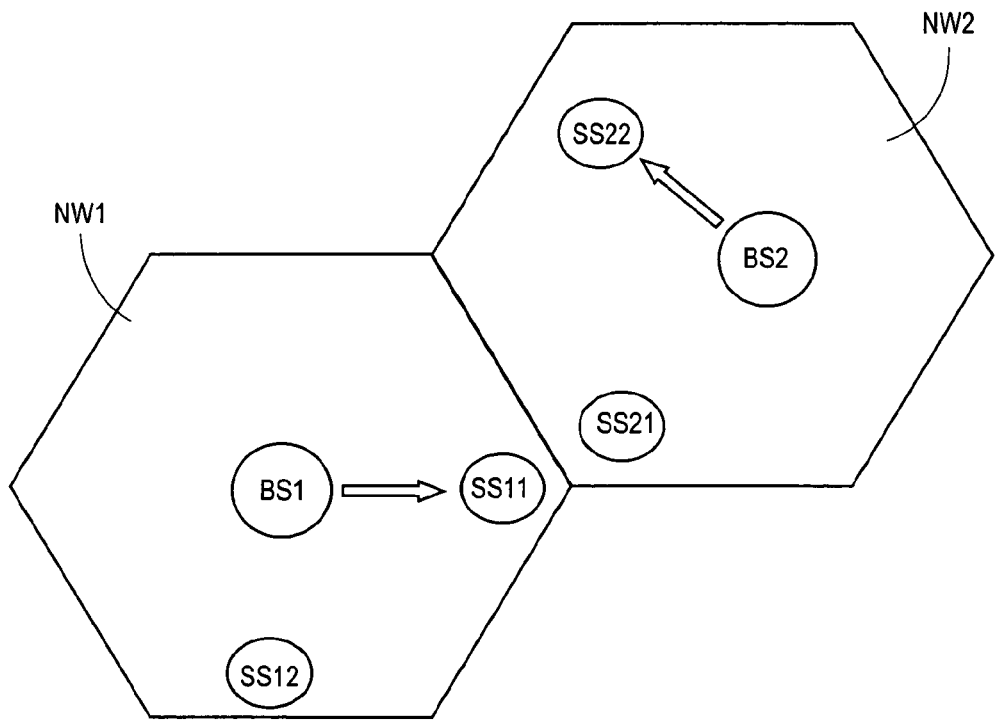

In a similar manner, in FIG. 2A interference may be caused when BS1 transmits to SS11 at the same time that BS2 transmits to SS21. Although the transmissions from the base stations may be directional, SS11 and SS21 may be located so close together that they each pick up the directional transmission from the other's base station, and thus neither may accurately receive its intended message. (For clarity of illustration, the interfering transmission from BS1 to SS21 is not shown). Following the rules described later in this document, BS1 may schedule the retransmission from BS1 to SS11 for a different part of the frame, to hopefully eliminate the interference caused by BS1 and BS2 transmitting to the same area at the same time. For example, the retransmission from BS1 to SS11 may take place when BS2 is transmitting to SS22 (illustrated in FIG. 2B). Assuming BS2 uses a directional transmission, SS11 will not be in the path of the transmission from BS2, and SS11 should receive the retransmission from BS1 without interference from BS2.

Although the examples of FIGS. 1A, 1B, 2A, and 2B pertain to changing the timing of a retransmission so that it occurs in a different part of a frame, other embodiments may change the frequency of the retransmission. For example, some types of networks use orthogonal frequency division multiple access (OFDMA) techniques, in which a device transmits different parts of its message on different frequencies at the same time. Instead of (or in addition to) scheduling a retransmission at a different time in the frame as before, the base station may schedule a retransmission for a different frequency or frequencies than before.

Before trying to avoid a repeat of the interference by changing the time or frequencies in the retransmission, the base station should first determine whether the poor reception was actually caused by interference. Corrupted data due to poor reception may be caused by one or more of 1) interference, 2) low signal level, and 3) noise. Interference is due to inadvertently receiving an undesired signal from another device at the same time as receiving the intended signal, with the undesired signal being strong enough to noticeably interfere with the intended signal. An interference signal is typically strong enough be decoded into a recognizable data, if the receiver's resources are applied to that goal. A low signal level at the receiver occurs when the strength of the intended signal is so low that the receiver cannot reliably amplify it to a useful level, and may be caused by the transmitting device being too far away. Background noise is whatever signal is left after removing the intended signal and any interference from the received signal. Noise generally has a fairly constant value over multiple transmissions, as does low signal level, while interference tends to be bursty in nature, occurring only when the interfering device is transmitting.

Various techniques have been developed to measure various parameters associated with the received signal. In particular, RSSI and SINR may be used in the techniques described here. Received Signal Strength Indicator (RSSI) is a measure of the strength of the received signal at the receiver, and includes the intended signal, any interfering signals, and noise. RSSI may be measured before the signal is demodulated into a baseband signal. Signal-to-interference-plus-noise-ratio (SINR) is a measure of the strength of the received signal compared to the combined value of interference and noise (I+N). I+N may be determined as part of the baseband processing, and in some embodiments may be determined by extracting the desired signal from the signal that RSSI was based on, which leaves the interference and noise signals remaining. Other methods of determining I+N may also be used. Note: for the purposes of this document, RSSI and I+N are each determined only for all or part of the received transmission, rather than being an average value taken over time for multiple transmissions.

SINR may be defined in various ways, two of which are shown here:

$$SINR = RSSI/(I+N)$$

or $$SINR = (RSSI - I - N)/(I+N) = S/(I+N)$$

Regardless of how SINR is defined, it should increase in value as the strength of S increases, and decrease in value as the strength of (I+N) increases. RSSI and SINR may be used to indicate whether interference is strong. If RSSI is small, then the received signal is weak, and corruption of the received data was probably due to the weak signal. But if RSSI is large while SINR is not large (indicating that Interference+Noise is large compared to the overall signal strength), then the corruption of the received data was probably caused by interference. The exact threshold values to be used for RSSI and SINR in this determination may be derived through various means, which are not discussed here in any detail. The results of this determination (whether corruption of the received data was likely caused by interference) may be communicated to the device that will schedule the retransmission (e.g., the base station), so that the retransmission may be made under conditions that are less likely to experience that interference. Although the determination described above was derived entirely from values for RSSI, I, and N, in some embodiments other factors may also be included in the final determination.

In some embodiments, threshold values for SINR and RSSI may be used to indicate whether the corrupted signal was likely caused by interference. For example, if RSSI is below a certain value, then the signal was too weak to be reliably decoded, and the weak signal, not interference, may be assumed to be the main cause of the corrupted reception. However, if RSSI is above a certain value, then it may be assumed that a weak signal was not the main cause of the problem, and SINR may be used to determine the cause. If SINR is below a certain threshold, then interference may be assumed to be the likely the cause of the signal corruption. If RSSI is high, while SINR is also high, then this calculation may be considered insufficient to determine if interference was the cause. Although these calculations may indicate whether the signal corruption is likely due to interference from another device, these factors alone may not be enough to determine if the interfering device is in the same network or another network as the device receiving the corrupted signal. However, if the network controller is supposed to schedule all such communications in its own network, it should be able to infer that the interfering device is in another network if it has no other devices scheduled to communicate at the time in question. This process is described in more detail in the description of FIGS. 5, 6, and 7.

Once a receiving device determines that it did not correctly receive a transmission, that device may notify the scheduling device of the error, which can trigger a retransmission. The request may also include an indicator of whether the probable cause of the error was interference or not. This indicator may then be used by the scheduling device to determine if the retransmission should be changed to a different time and/or different frequencies than would otherwise be used for the retransmission. In some operations, the receiving device is a SS, and it may wirelessly transmit a notice to the BS that the transmission was not correctly received and that the cause of the error was or was not likely to be interference, so that BS may schedule the retransmission. In other operations, the receiving device is the BS, and it may internally notify its scheduling module that a retransmission is needed, and whether the error was likely caused by interference.

Figure 3:
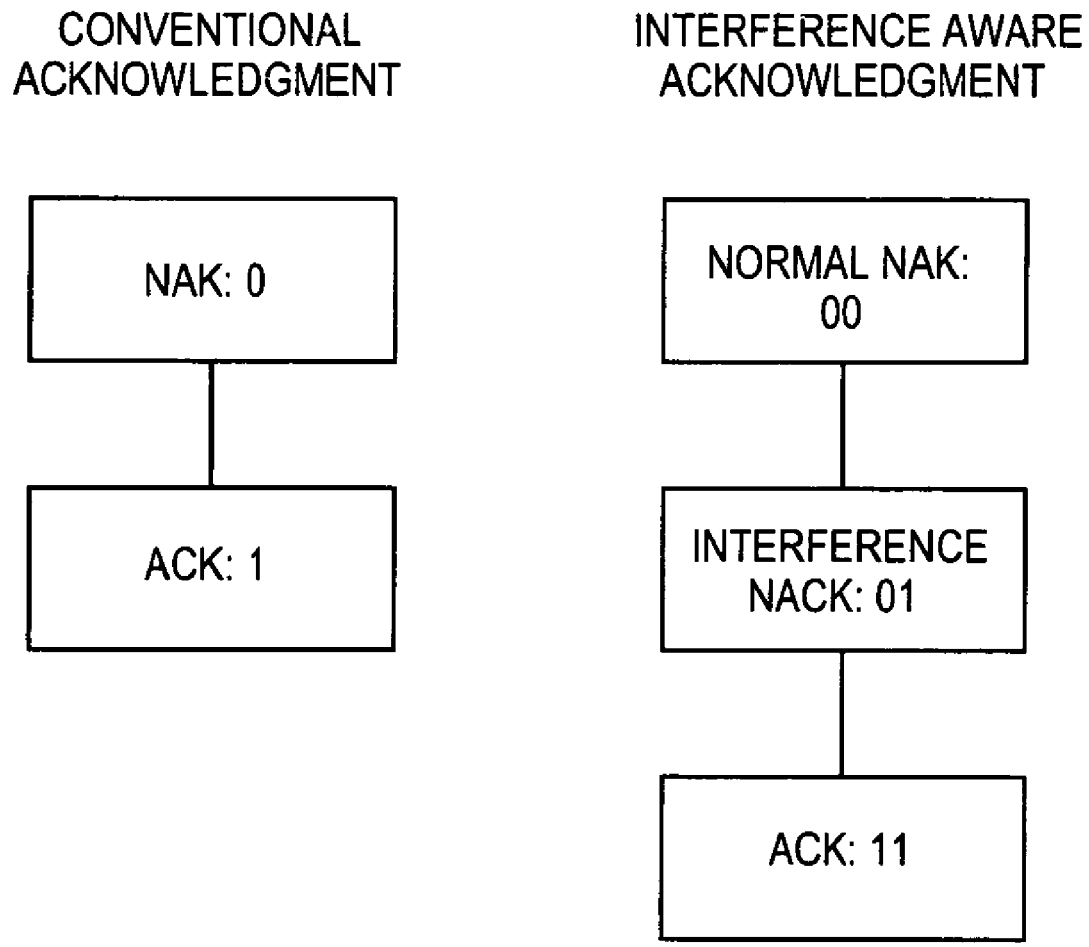
FIG. 3 shows a diagram of a format for indicating ACK and NAK conditions, according to an embodiment of the invention.

FIG. 3 shows a diagram of a format for indicating ACK and NAK conditions, according to an embodiment of the invention. In a conventional system, a single bit may be used to indicate whether an ACK (acknowledgement that the signal was correctly received) or a NAK (non-acknowledgement, to indicate the signal was not correctly received) is intended (e.g., '0' indicates a NAK and '1' indicates an ACK, though the reverse assignments may also be used). In some of the embodiments described herein, two bits may be used to indicate an ACK, an interference NAK, or a normal (non-interference) NAK. In the illustrated examples, a '1' in both bits indicates an ACK, while a '0' in the left-most bit indicates a NAK, with an accompanying '1' in the right-most bit indicating an interference NAK and an accompanying '0' in the right-most bit indicating a normal (non-interference) NAK. These are only examples, and these conditions may be indicated with other bit arrangements and/or other quantities of bits. Further, the ACK and NAK indicators may be placed into any feasible format for transmission. The use of the interference indicator is an indication that interference was likely the cause of the signal corruption, while use of the non-interference indicator is an indication that such interference was not determined to be the likely cause. The term 'likely' is an indication of confidence level, and various thresholds for RSSI and SINR may be used to define that level of confidence.

Figure 4:
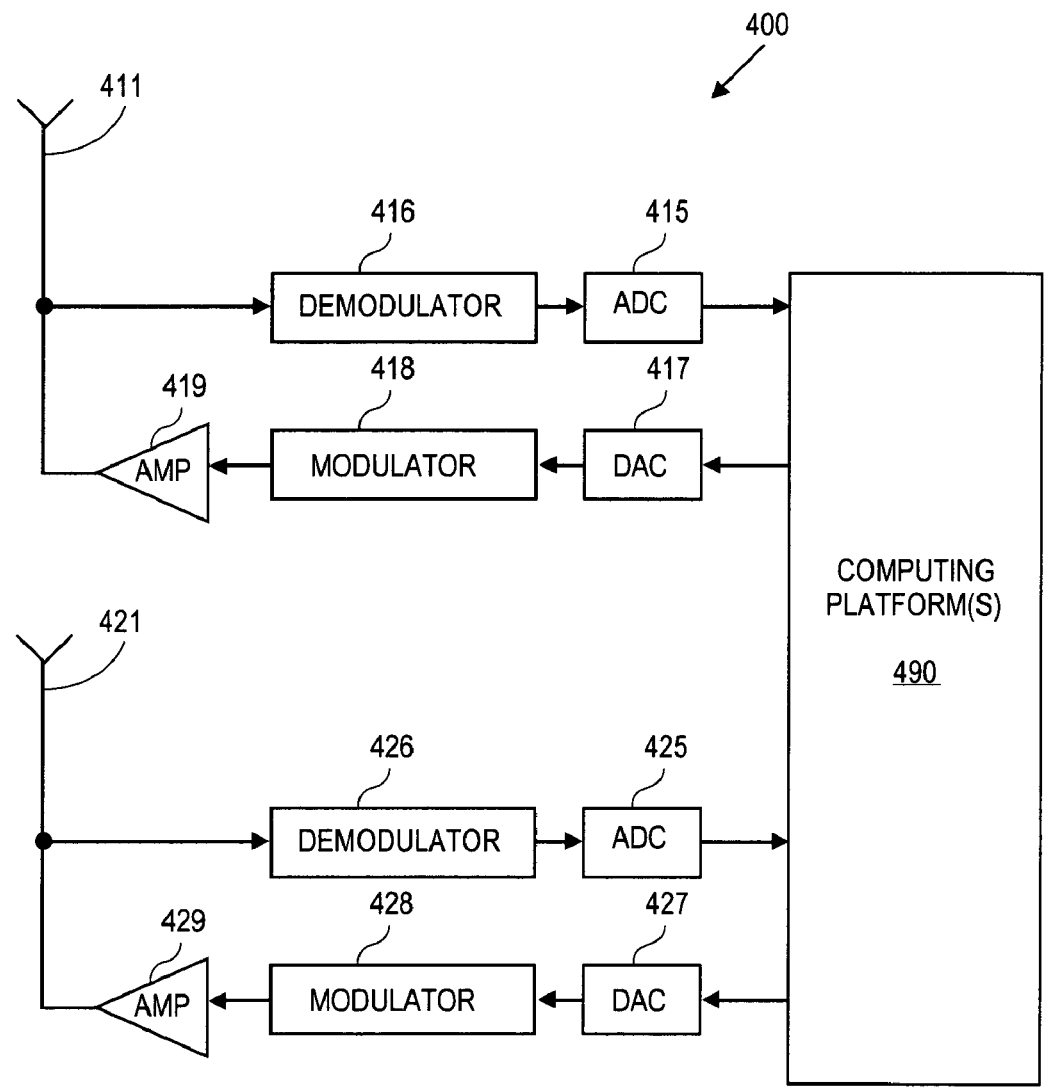
FIG. 4 shows a diagram of a wireless communications device, according to an embodiment of the invention.

FIG. 4 shows a diagram of a wireless communications device, according to an embodiment of the invention. Any of the aforementioned devices BS1, BS2, SS11, SS12, SS21, and SS22 may contain some or all of the components shown in illustrated device 400. For example, one or more computing platforms 490 may be used to control overall operations of the device 400. A computing platform may contain one or more processors, including an applications processor and/or a digital signal processor. This particular embodiment shows two antennas 411 and 421, but other embodiments may contain one, three, or more antennas, each with necessary supporting components. The device may also contain signal processing circuitry between the antennas and the processing platform. For example, in this embodiment antenna 411 is shown coupled to a demodulator 416 to demodulate the received signal and convert it to a baseband signal. The baseband signal may then be converted to digital format with analog-to-digital converter (ADC) 415. For transmissions, digital signals may be converted to analog with digital-to-analog converter (DAC) 417. The analog signals may then be modulated onto a radio frequency (RF) carrier wave through modulator 418, and then amplified in power amp 419 for transmission through antenna 411.

Similar functionality may be provided for antenna 421 by demodulator 426, ADC 425, DAC 427, modulator 428, and amplifier 429. FIG. 4 shows one embodiment of a configuration of a wireless communications device, but other embodiments may use different components, and/or may arrange components in a different manner than shown.

Figure 5:
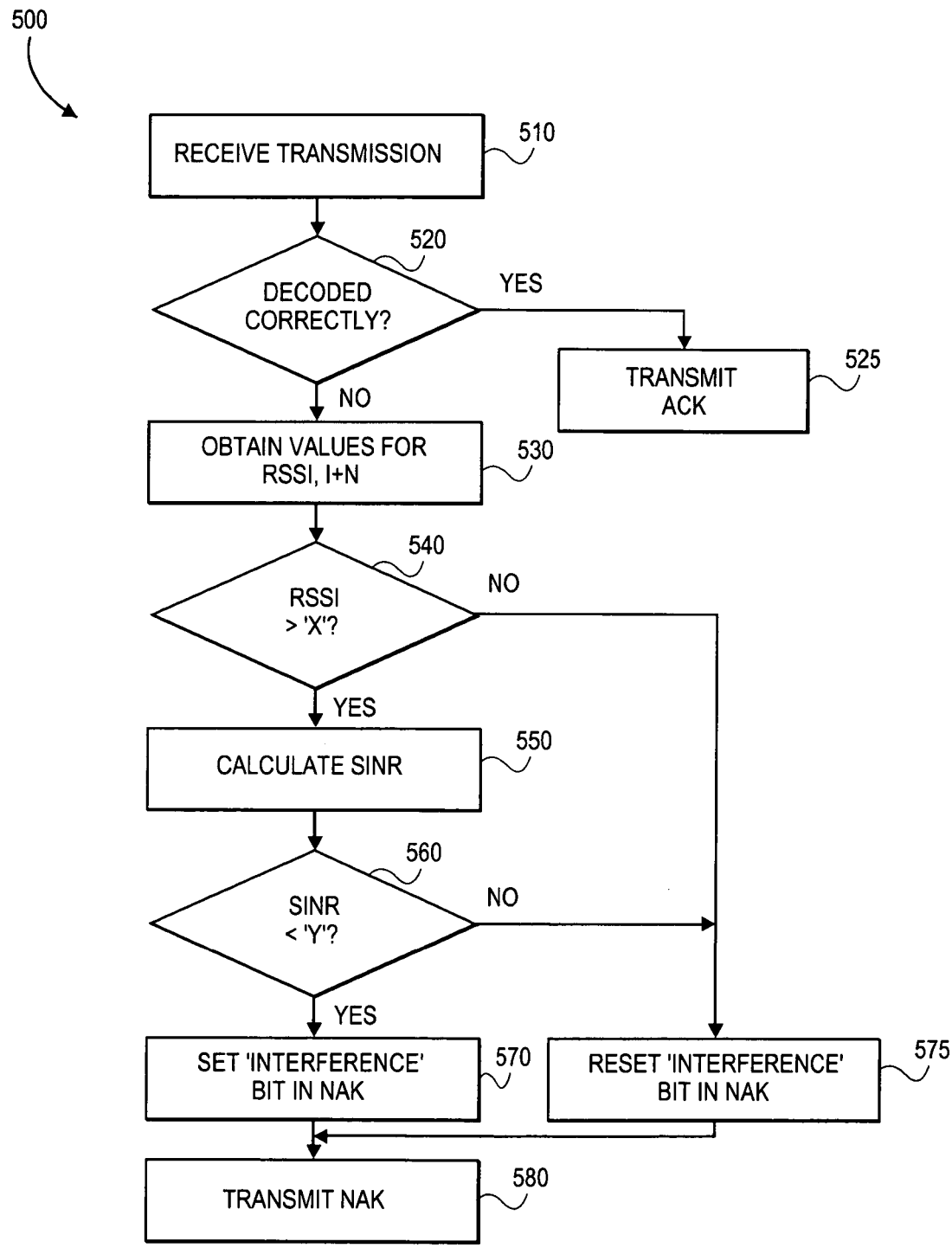
FIG. 5 shows a flow diagram of a method of receiving a corrupted signal in a subscriber station, according to an embodiment of the invention.

FIG. 5 shows a flow diagram of a method of receiving a corrupted signal in a SS, according to an embodiment of the invention. In the illustrated method of flow diagram 500, the SS may receive a transmission from the base station at 510. If the transmission is decoded without errors (or with correctable errors only), as indicated at 520, then at 525 the SS may transmit an ACK to the base station to acknowledge correct reception. (Note: any reference to 'errors' or 'corrupted data' in this document refers to uncorrectable errors that prompt a retransmission.) But if the transmission was corrupted so that the correct message could not be correctly decoded, the SS may try to determine what the likely cause of the errors were before transmitting a NAK back to the base station.

At 530, the SS may obtain values for Received Signal Strength Indicator (RSSI), and Interference plus Noise (I+N). If the value of RSSI is less than a predetermined threshold value (identified here as 'X'), as determined at 540, then it may be assumed the received errors were caused because the signal level of the desired signal was too weak to be reliably processed. As a result, at 575 the 'interference' bit in the NAK may be reset to a value indicating interference was not the probable cause of the errors, before transmitting the NAK at 580. Alternatively, if the value of RSSI is greater than 'X', SINR may be calculated at 550 and compared with another value (identified here as 'Y') at 560. If SINR is greater than Y, it may be assumed that interference from another device was not the cause of the errors, and the Interference bit reset at 575 before transmitting the NAK at 580. Alternatively, if SINR is less than 'Y', it may be assumed that the cause of the errors was an interfering signal transmitted by another device. This determination is based on the assumption that if I+N is strong enough to overcome a strong intended signal, then interference from a nearby device is the most likely cause. In this case, the Interference bit in the NAK may be set at 570 to value indicating interference, and the NAK transmitted at 580. This information may then be used by the base station to schedule a retransmission of the relevant data. Note: in blocks 540 and 560, if the parameter is exactly equal to the indicated value, this may be interpreted as either less than, or greater than, the indicated value, depending of the specifics of the way the algorithm was programmed. This rule also applies to decision blocks in FIGS. 6 and 7.

Figure 6:
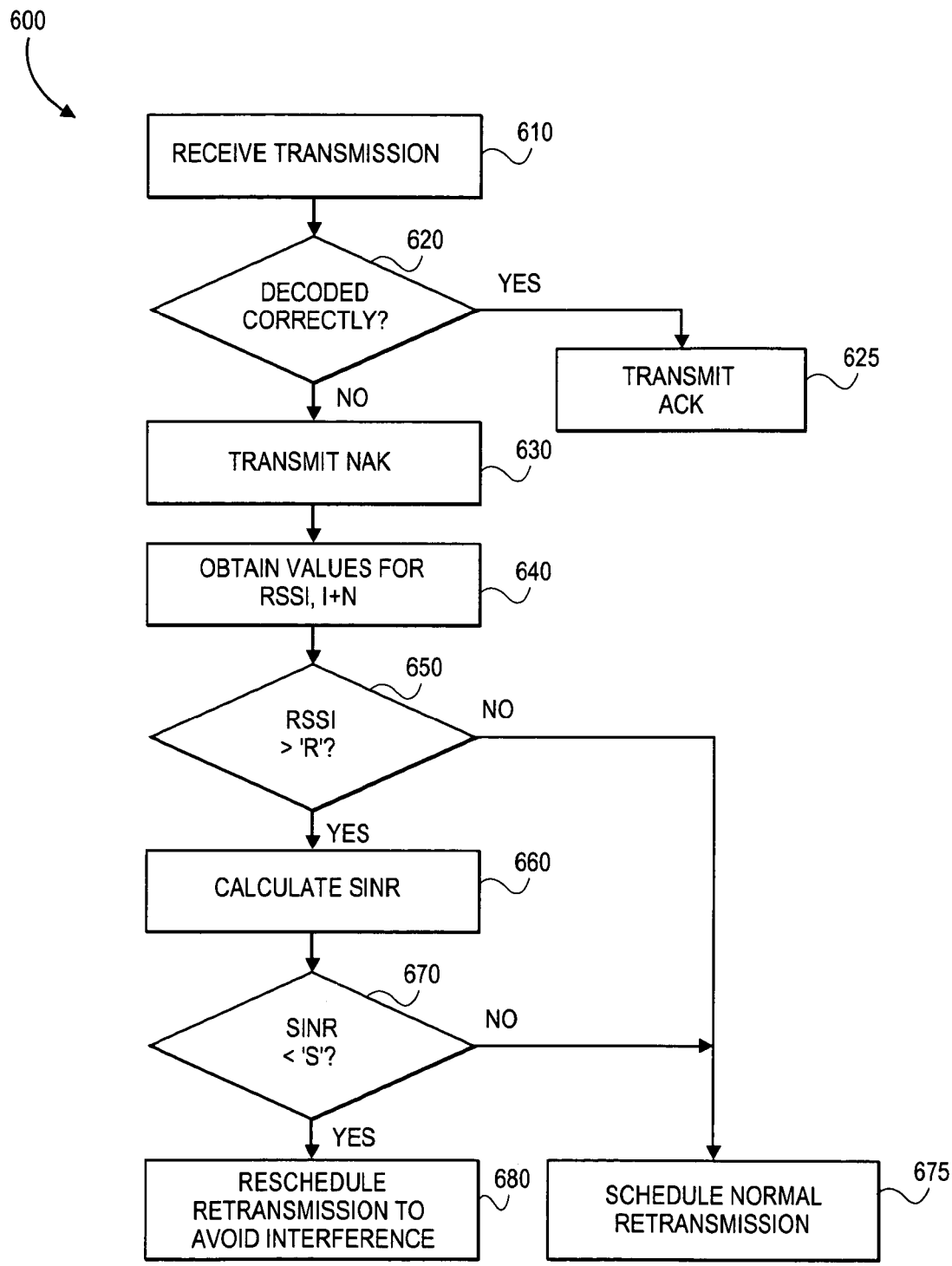
FIG. 6 shows a flow diagram of a method of receiving a corrupted signal in a base station, according to an embodiment of the invention.

FIG. 6 shows a flow diagram of a method of receiving a corrupted signal in a base station, according to an embodiment of the invention. The process in FIG. 6 for a base station is similar to the process in FIG. 5 for a SS, except that the base station does the scheduling, and therefore does not need to transmit the interference bit to another device. In the illustrated method of flow diagram 600, the base station may receive a transmission from a SS at 610. If the transmission is decoded without uncorrectable errors, as indicated at 620, then at 625 the base station may transmit an ACK to the SS to acknowledge correct reception. But if the transmission was corrupted so that the correct message could not be correctly decoded, the base station may transmit a NAK back to the SS at 630, and then determine when or how to schedule a retransmission of the data.

At 640 the base station obtains values for RSSI and I+N for the corrupted transmission. If RSSI is less than the value 'R', as determined at 650, it may be assumed the error in the reception was due to the received signal being to weak to be reliably decoded. In this case, the retransmission may be scheduled as it normally would, rather than being rescheduled, as indicated at 675. However, if RSSI is greater than 'R', as determined at 650, the base station may calculate SINR at 660, and compare SINR to the value 'S' at 670. If SINR is greater than 'S', the base station may schedule the retransmission as it normally would, as indicated at 675. But if SINR is less than 'S', the base station may reschedule the retransmission at 680 for another time and/or frequencies, in an attempt to avoid the same interference situation that triggered the retransmission.

Figure 7:
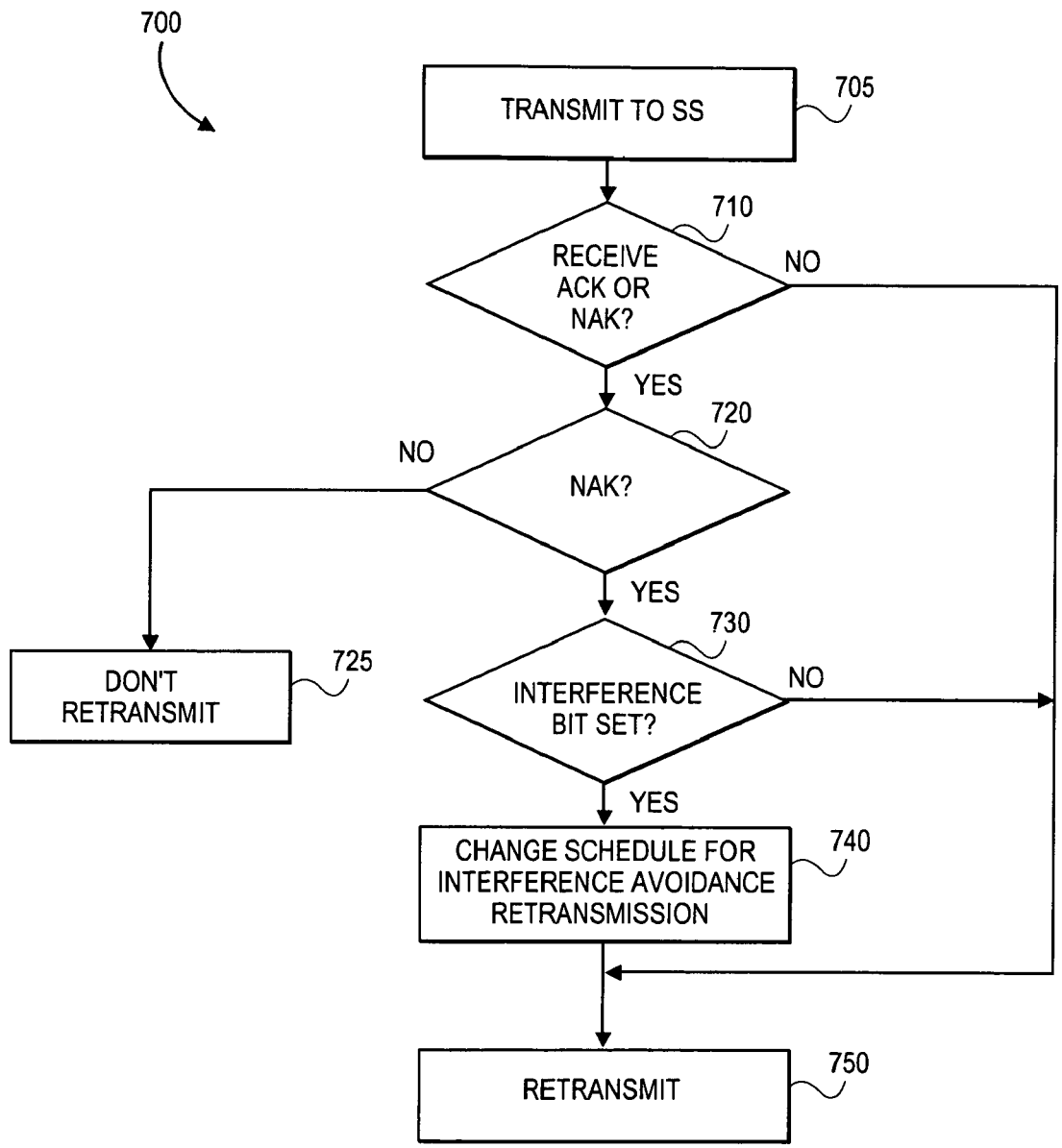
FIG. 7 shows a flow diagram of a method of receiving a NAK in a base station, according to an embodiment of the invention.

FIG. 7 shows a flow diagram of a method of receiving a NAK in a base station, according to an embodiment of the invention. In some embodiments, this method represents the procedure followed by a base station after it receives the NAK that was transmitted from the SS in FIG. 5. In flow diagram 700, at 705 the base station makes a transmission to a SS, and then waits to receive an ACK or NAK from the SS. If neither is received, as determined at 710, the base station may not have any information on why the communication failed, and may make arrangements for a normal retransmission at 750. If the base station does receive an ACK or a NAK, and that reception is determined at 720 to be an ACK, then there may be no need to retransmit the data, as indicated at 725. If a NAK is received, as determined at 720, then the base station may examine the contents of the NAK at 730 to determine if the interference bit is set. If the interference bit is not set, the base station may retransmit in the normal manner. But if the interference bit is set, this would indicate that the SS determined that interference from a neighboring device was the likely cause of its failure to receive the transmission of 705. Based on this determination that interference was the likely cause, at 740 the base station may change its normal schedule for retransmitting the data, before actually retransmitting it at 750.

The foregoing description is intended to be illustrative and not limiting. Variations will occur to those of skill in the art. Those variations are intended to be included in the various embodiments of the invention, which are limited only by the scope of the following claims.

What is claimed is:

1. An apparatus, comprising
a first wireless communications device having a processing platform and signal processing circuitry, the first wireless communications device to process a communication containing a one-bit NAK indicator,
wherein the one-bit NAK indicator is either a first value to indicate that interference was a likely cause of errors in an incorrectly received transmission, or a second value to indicate that interference was not a likely cause of errors in the incorrectly received transmission.

2. The apparatus of claim 1, wherein:
the first wireless communications device comprises a base station;
the communication is received from a subscriber station in a same network as the base station;
the incorrectly received transmission was a transmission from the base station that was incorrectly received by the subscriber station;
wherein the base station is to use the one-bit NAK indicator to determine how to schedule a retransmission of the received transmission.

3. The apparatus of claim 2, wherein the transmission is transmitted in first time/frequency resources of a first frame and the base station is to:
in an event the one-bit NAK indicator is the second value, schedule the retransmission in second time/frequency resources of a second frame that correspond to the first time/frequency resources of the first frame; and
in an event the one-bit NAK indicator is the first value, schedule the retransmission in third time/frequency resources of the second frame that are different from the first time/frequency resources of the first frame.

4. The apparatus of claim 1, wherein:
the first wireless communications device comprises a subscriber station that is to set the one-bit NAK indicator as the first value or the second value and to transmit the communication to a base station; and
the incorrectly received transmission was a transmission from the base station that was incorrectly received by the subscriber station.

5. The apparatus of claim 1, wherein the one-bit NAK indicator is derived at least in part from parameters indicating values for received signal strength (RSSI), interference (I) and noise (N).

6. The apparatus of claim 5, wherein the one-bit NAK indicator is derived at least in part by calculating a value equal to RSSI/(I+N).

7. The apparatus of claim 1, further comprising at least one antenna coupled to the signal processing circuitry.

\* \* \* \* \*